(12) United States Patent
Yoshihara et al.

(10) Patent No.: US 8,466,861 B2
(45) Date of Patent: Jun. 18, 2013

(54) LIQUID CRYSTAL DISPLAY DEVICE AND DISPLAY METHOD

(75) Inventors: Toshiaki Yoshihara, Kawasaki (JP); Tetsuya Makino, Kakogawa (JP); Shinji Tadaki, Kawasaki (JP); Hironori Shiroto, Kobe (JP); Yoshinori Kiyota, Kawasaki (JP); Keiichi Betsui, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 12/060,482

(22) Filed: Apr. 1, 2008

(65) Prior Publication Data
US 2008/0192158 A1    Aug. 14, 2008

Related U.S. Application Data

(63) Continuation of application No. PCT/JP2005/018468, filed on Oct. 5, 2005.

(51) Int. Cl.
G09G 3/36 (2006.01)

(52) U.S. Cl.
USPC ................................................ 345/87; 349/6

(58) Field of Classification Search
USPC ........ 345/4, 87; 349/33, 74, 61, 147; 434/365
See application file for complete search history.

(56) References Cited

U.S. PATENT DOCUMENTS

| | | | | |
|---|---|---|---|---|
| 5,050,965 A | * | 9/1991 | Conner et al. | 349/6 |
| 5,495,351 A | * | 2/1996 | Shingaki et al. | 349/74 |
| 5,695,346 A | * | 12/1997 | Sekiguchi et al. | 434/365 |
| 6,191,833 B1 | * | 2/2001 | Hirakata | 349/61 |
| 6,535,261 B1 | * | 3/2003 | Anno et al. | 349/147 |
| 2002/0000960 A1 | | 1/2002 | Yoshihara et al. | |
| 2004/0017342 A1 | * | 1/2004 | Sekine | 345/87 |

FOREIGN PATENT DOCUMENTS

| | | |
|---|---|---|
| JP | A 3-132625 | 6/1991 |
| JP | A 11-119189 | 4/1999 |
| JP | A 2002-214566 | 7/2002 |
| JP | 2002-221700 | 8/2002 |
| JP | 2003-202544 | 7/2003 |
| JP | 2004-245976 | 9/2004 |

OTHER PUBLICATIONS

Japanese Office Action mailed Oct. 5, 2010 for Japanese Patent Application No. 2007-539769.

(Continued)

*Primary Examiner* — Amare Mengistu
*Assistant Examiner* — Yuk Chow
(74) *Attorney, Agent, or Firm* — Greer Burns & Crain, Ltd.

(57) ABSTRACT

A liquid crystal display device displays an image by stacking a plurality of liquid crystal panels, and by controlling a light transmittance with voltage application to liquid crystal of each panel, wherein during execution of voltage application to the liquid crystal of one of the panels, a voltage to the liquid crystal of the other panel serves as a non-display voltage. No image is displayed simultaneously on the two or more stacked liquid crystal panels. In the liquid crystal panel to which no voltage is applied and on which no image is displayed, the longitudinal axial direction of liquid crystal molecules coincides with the polarizing axial direction of polarizers, or is orthogonal to the polarizing axial direction; therefore, no influence is exerted on the overall double refraction, and the overall voltage-transmitted light intensity characteristic corresponds to the sum of the voltage-transmitted light intensity characteristics of the respective panels.

8 Claims, 14 Drawing Sheets

OTHER PUBLICATIONS

Yoshihara T., et al., "A Full-Color Video Rate FLC Display Based on a Time Domain Color Switching With a TFT Array," 17th International Liquid Crystal Conference, p. 25, PI-74, Jul. 19-24, 1998.

Yoshihara T., et al., "A Full-color FLC Display Based on Field Sequential Color with TFTs," AM-LCD '99, Digest of Technical Papers, p. 185, Jul. 14-16, 1999.

Yoshihara T., et al., "Invited Paper: A 254-ppi Full-color Video Rate TFT-LCD Based on Field Sequential Color and FLC Display," SID '00, Digest of Technical Papers, p. 1176, May 2000.

Data M., et al., "Luminance Additivity in Compact Depth-Fused-3D Display Using a Stack of Two TN-LCDs," IDW'03, Proceedings of the 10th International Display Workshops, p. 1409, 2003.

* cited by examiner

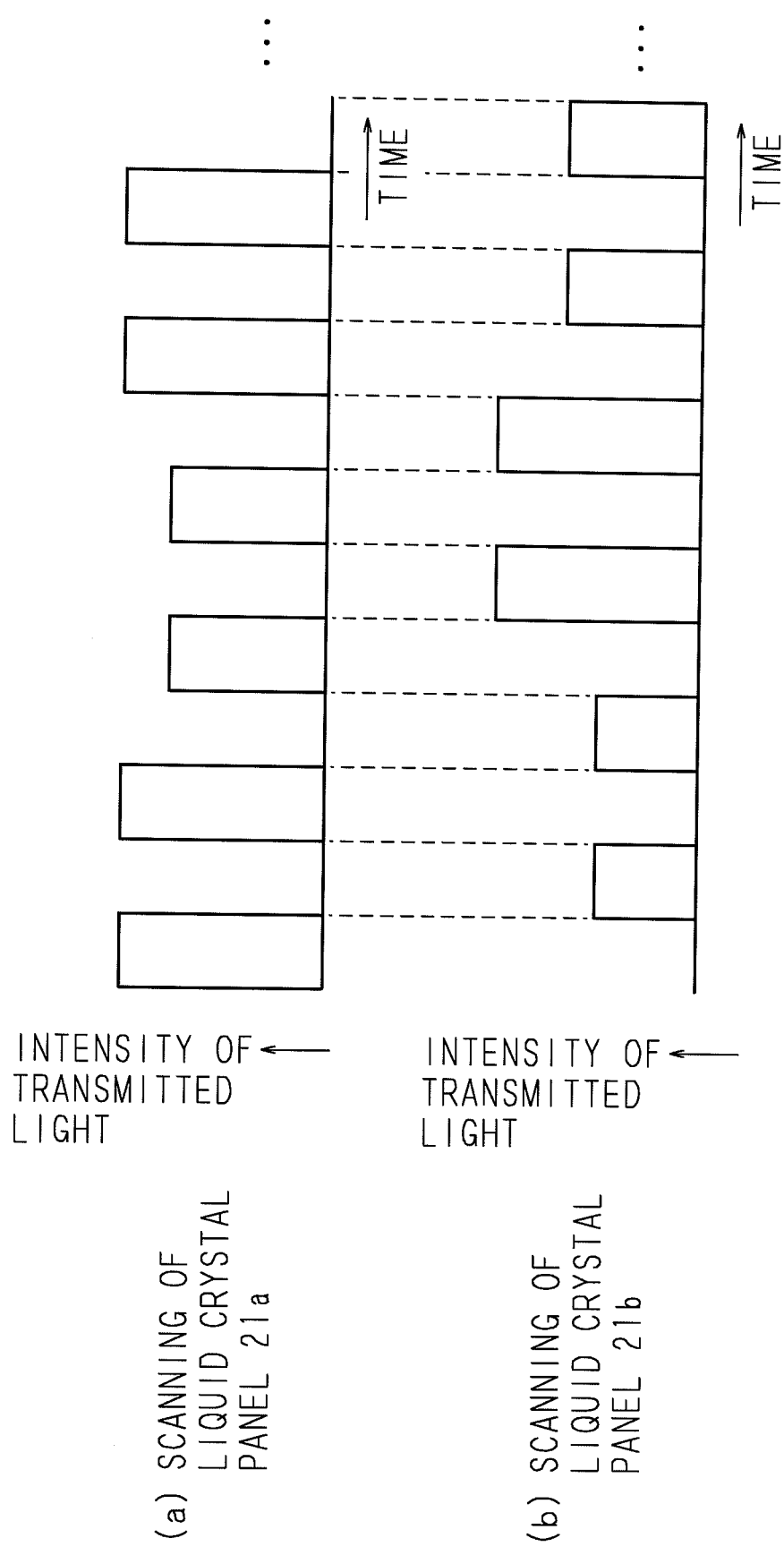

LIQUID CRYSTAL DISPLAY DEVICE AND DISPLAY METHOD

This application is a continuation of PCT International Application No. PCT/JP2005/018468 which has an International filing date of Oct. 5, 2005 and designated the United States of America.

BACKGROUND

1. Technical Field

The present invention relates to liquid crystal display devices and display methods for displaying images by stacking a plurality of liquid crystal panels.

2. Description of Related Art

With the recent advancement of so-called "information-aligned society", electronic equipment, typified by personal computers, PDA (Personal Digital Assistants) and the like, is now being widely used. Due to the widespread use of such electronic equipment, the demand for portable electronic equipment usable in offices and outdoors has been created, and the reduction in size and weight thereof has been desired. As a means for achieving such objects, liquid crystal display devices are widely used. Liquid crystal display devices represent the indispensable technique for realizing the reduction in power consumption of battery-driven portable electronic equipment, as well as for merely realizing the reduction in size and weight thereof.

Liquid crystal display devices are roughly classified into a reflective liquid crystal display device and a transmissive liquid crystal display device. The reflective liquid crystal display device is designed so that light beam to be incident from a front face of a liquid crystal panel is reflected by a rear face of the liquid crystal panel, and an image is visually identified by the reflected light, while the transmissive liquid crystal display device is designed so that an image is visually identified by a transmitted light from a light source (i.e., backlight) provided at a rear face of a liquid crystal panel. The reflective liquid crystal display device is inferior in visibility since an amount of the reflected light is inconstant depending on environmental conditions; therefore, in particular, as a display device for a personal computer or the like which performs multi-color or full-color display, a transmissive color liquid crystal display device, which uses color filters, is commonly utilized.

As the color liquid crystal display device, an active-driven-type liquid crystal display device that uses a switching element such as a TFT (Thin Film Transistor) is widely utilized at present. Although this TFT-driven liquid crystal display device has a high display quality, the light transmittance of a liquid crystal panel is as low as about several percent under the status quo, and therefore, a high brightness backlight is required in order to obtain high screen brightness. Thus, the power consumption caused by the backlight is unfavorably increased. Furthermore, since the color display that uses color filters is performed, each pixel has to be composed of three sub-pixels, thus making it difficult to realize high resolution and making the display color purity insufficient.

In order to solve such problems, the present inventors have developed a field sequential liquid crystal display device (see, for example, Non-Patent Documents 1, 2, and 3). This field sequential liquid crystal display device does not need any sub-pixels unlike a color filter liquid crystal display device, and is thus capable of realizing higher resolution display with ease and utilizing the color of light emitted from a light source as it is without using any color filters, resulting in high display color purity. Moreover, the light use efficiency is also high, which further achieves an advantage that the power consumption is low. However, in order to realize the field sequential liquid crystal display device, the fast response of liquid crystal (2 ms or less) is absolutely necessary.

Therefore, in a quest to achieve the fast response of the field sequential liquid crystal display device having the excellent advantages as described above, the present inventors have conducted research and development on the driving of liquid crystal, such as ferroelectric liquid crystal having spontaneous polarization which can be expected to exhibit a response 100 to 1000 times faster than ever before, by a switching element such as a TFT (see, for example, Patent Document 1). In ferroelectric liquid crystal, the longitudinal axial direction of liquid crystal molecules aligned in parallel with a glass substrate is tilted by voltage application. A liquid crystal panel containing ferroelectric liquid crystal therein is sandwiched between two polarizers whose polarizing axes are orthogonal to each other, and the double refraction caused by a change in the longitudinal axial direction of liquid crystal molecules is utilized to change the intensity of transmitted light.

Actually, in recent years, the need for three-dimensional image display has also been intensified, and a liquid crystal display device for displaying a three-dimensional image by stacking a plurality of liquid crystal panels has been proposed (see, for example, Non-Patent Document 4).

[Patent Document 1] Japanese Patent Application Laid-Open No. 11-119189

[Non-Patent Document 1] T. Yoshihara et al., ILCC 98, P1-074, published in 1998

[Non-Patent Document 2] T. Yoshihara et al., AM-LCD '99 Digest of Technical Papers, p. 185, published in 1999

[Non-Patent Document 3] T. Yoshihara et al., SID '00 Digest of Technical Papers, p. 1176, published in 2000

[Non-Patent Document 4] M. Date et al., IDW '03 Proceedings of The 10th International Display Workshops, p. 1409, published in 2003

SUMMARY

Problems to be Solved by the Invention

In a liquid crystal display device for displaying an image by stacking a plurality of liquid crystal panels, the overall voltage-transmitted light intensity characteristic ideally corresponds to the sum of the voltage-transmitted light intensity characteristics of the respective liquid crystal panels. However, in the case of using a liquid crystal panel in which molecules of liquid crystal such as ferroelectric liquid crystal are aligned approximately in parallel with a glass substrate, under the influence of double refraction, the voltage-transmitted light intensity characteristic, obtained when a plurality of liquid crystal panels are stacked, does not correspond to the sum of the voltage-transmitted light intensity characteristics of the respective liquid crystal panels, thus causing a problem that the resultant transmitted light intensity is lower than the transmitted light intensity of each liquid crystal panel. It should be noted that such a problem also similarly occurs in an IPS (in-plane switching) liquid crystal display device using nematic liquid crystal, in which liquid crystal molecules are aligned approximately in parallel with a substrate as in the case of ferroelectric liquid crystal.

An object is to provide a liquid crystal display device and a display method which allow the overall voltage-transmitted light intensity characteristic to correspond to the sum of the voltage-transmitted light intensity characteristics of respective liquid crystal panels by preventing a voltage for display from being applied simultaneously to the stacked liquid crystal panels so as not to display an image simultaneously thereon.

Means for Solving the Problems

There is provided a liquid crystal display device according to an aspect for displaying an image by stacking a plurality of liquid crystal panels in each of which a gap formed by a plurality of substrates is filled with liquid crystal, and by controlling a liquid crystal light transmittance with voltage application to the liquid crystal of the stacked liquid crystal panels, the liquid crystal display device characterized by including controlling means for controlling voltage application to the liquid crystal of each of the plurality of liquid crystal panels, wherein during execution of voltage application to the liquid crystal of one of the liquid crystal panels based on display data, a voltage to the liquid crystal of the other liquid crystal panel serves as a non-display voltage that exerts no influence on the display of said one of the liquid crystal panels. Specifically, this means that the application of a voltage to the other liquid crystal panel is stopped, and no voltage is applied thereto. Further, the potential of this non-display voltage may be a predetermined reference potential, and may naturally be 0 volt. It should be noted that "0 volt" as used herein means substantial 0 volt, and includes a potential low enough to exert no influence on display.

There is provided a display method according to an aspect for displaying an image by stacking a plurality of liquid crystal panels, in each of which a gap formed by a plurality of substrates is filled with liquid crystal, so as to sandwich the panels between polarizers, and by controlling a liquid crystal light transmittance with voltage application to the liquid crystal of the stacked liquid crystal panels, the display method characterized in that an image is displayed so that during voltage application to the liquid crystal of one of the liquid crystal panels based on display data, the longitudinal axial direction of liquid crystal molecules of the other liquid crystal panel is orthogonal to the polarizing axial direction or polarizing axes of the polarizers.

There is provided a display method according to an aspect for displaying an image by stacking a plurality of liquid crystal panels in each of which a gap formed by a plurality of substrates is filled with liquid crystal, and by controlling a liquid crystal light transmittance with voltage application to the liquid crystal of the stacked liquid crystal panels based on display data, the display method characterized in that there is provided a period during which no image is displayed simultaneously on two or more of the plurality of liquid crystal panels.

Effects of the Invention

The voltage application to the liquid crystal of each of the plurality of liquid crystal panels is controlled, and no image is displayed simultaneously on the two or more liquid crystal panels; therefore, no influence is exerted on the overall double refraction, thus allowing the overall voltage-transmitted light intensity characteristic to correspond to the sum of the voltage-transmitted light intensity characteristics of the respective liquid crystal panels.

BRIEF DESCRIPTION OF THE SEVERAL VIEWS OF THE DRAWINGS

FIG. 14 shows diagrams illustrating the transmitted light intensities of the liquid crystal panels, caused by the driving sequence shown in FIG. 13.

Figure 1:
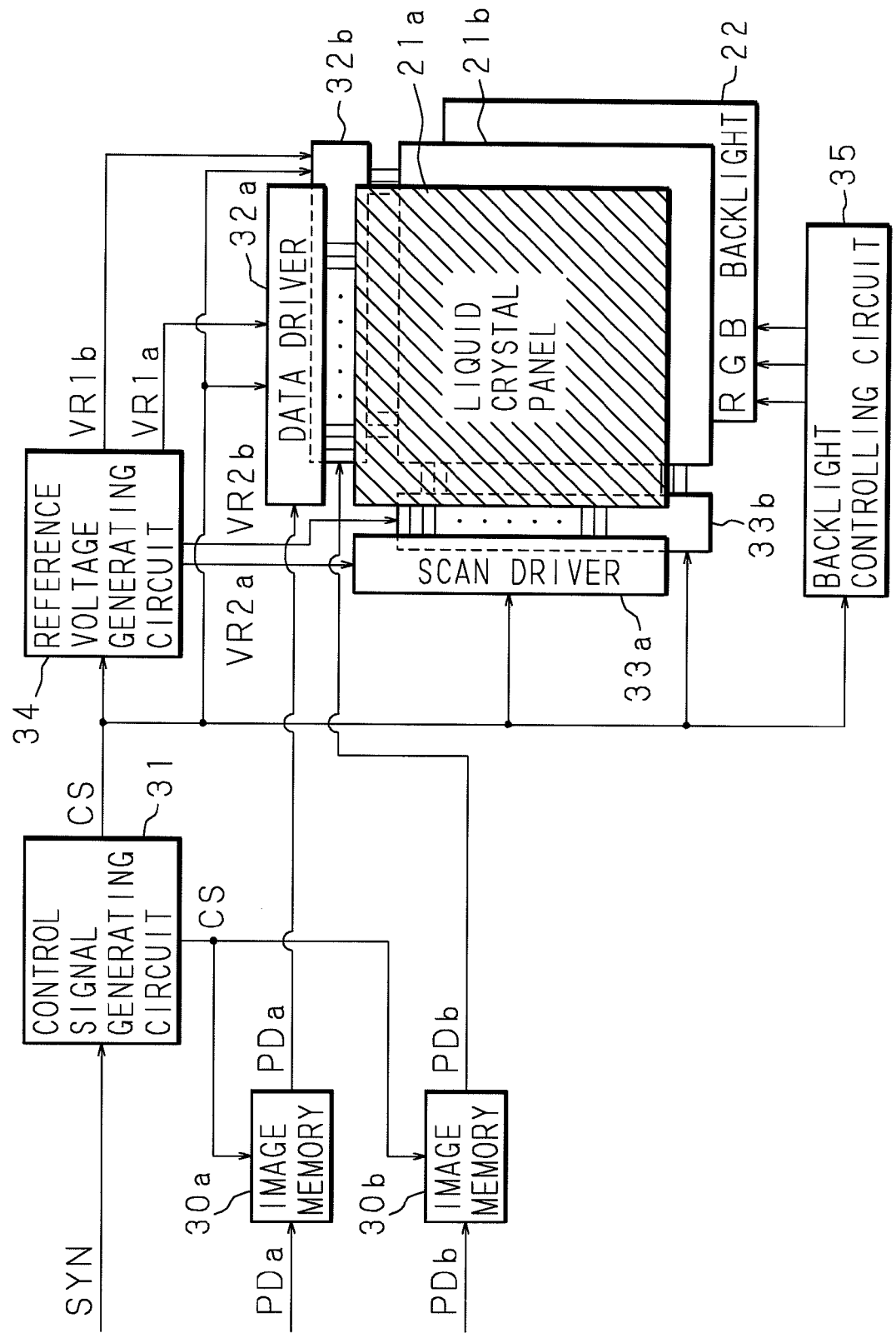
FIG. 1 is a block diagram illustrating a circuit configuration of a liquid crystal display device according to a first embodiment (field sequential system)

DESCRIPTION OF THE NUMERALS 1, 5 polarizer
2a, 2b, 4a, 4b glass substrate
3a, 3b common electrode
7 LED array
13a, 13b liquid crystal layer
21a, 21b liquid crystal panel
22 backlight
30a, 30b image memory
31 control signal generating circuit
32a, 32b data driver
33a, 33b scan driver
34 reference voltage generating circuit
35 backlight controlling circuit
40a, 40b pixel electrode
41a, 41b TFT
50a, 50b driving section

DETAILED DESCRIPTION

<Embodiment 1>

Figure 2:
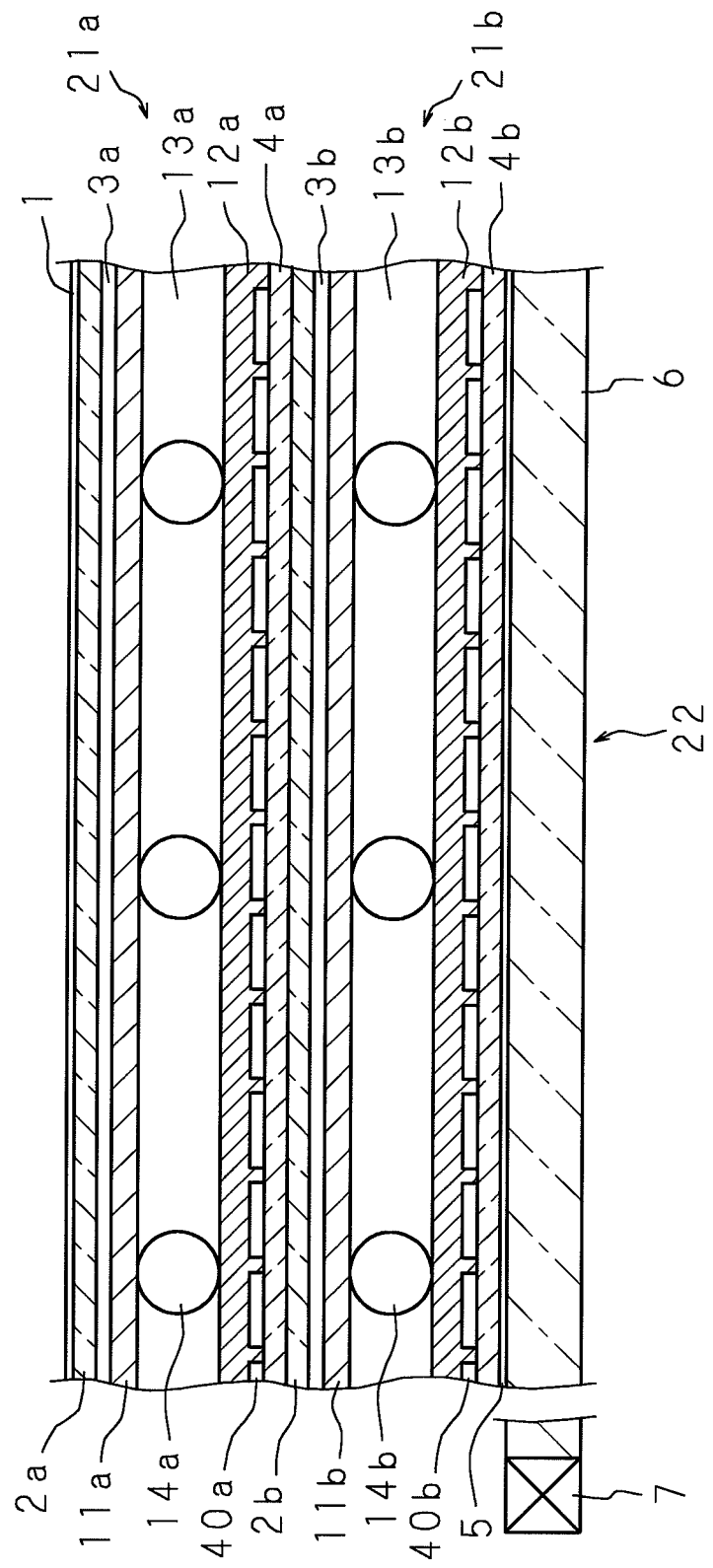
FIG. 2 is a schematic cross-sectional view of liquid crystal panels and a backlight of the liquid crystal display device according to the first embodiment.
Figure 3:
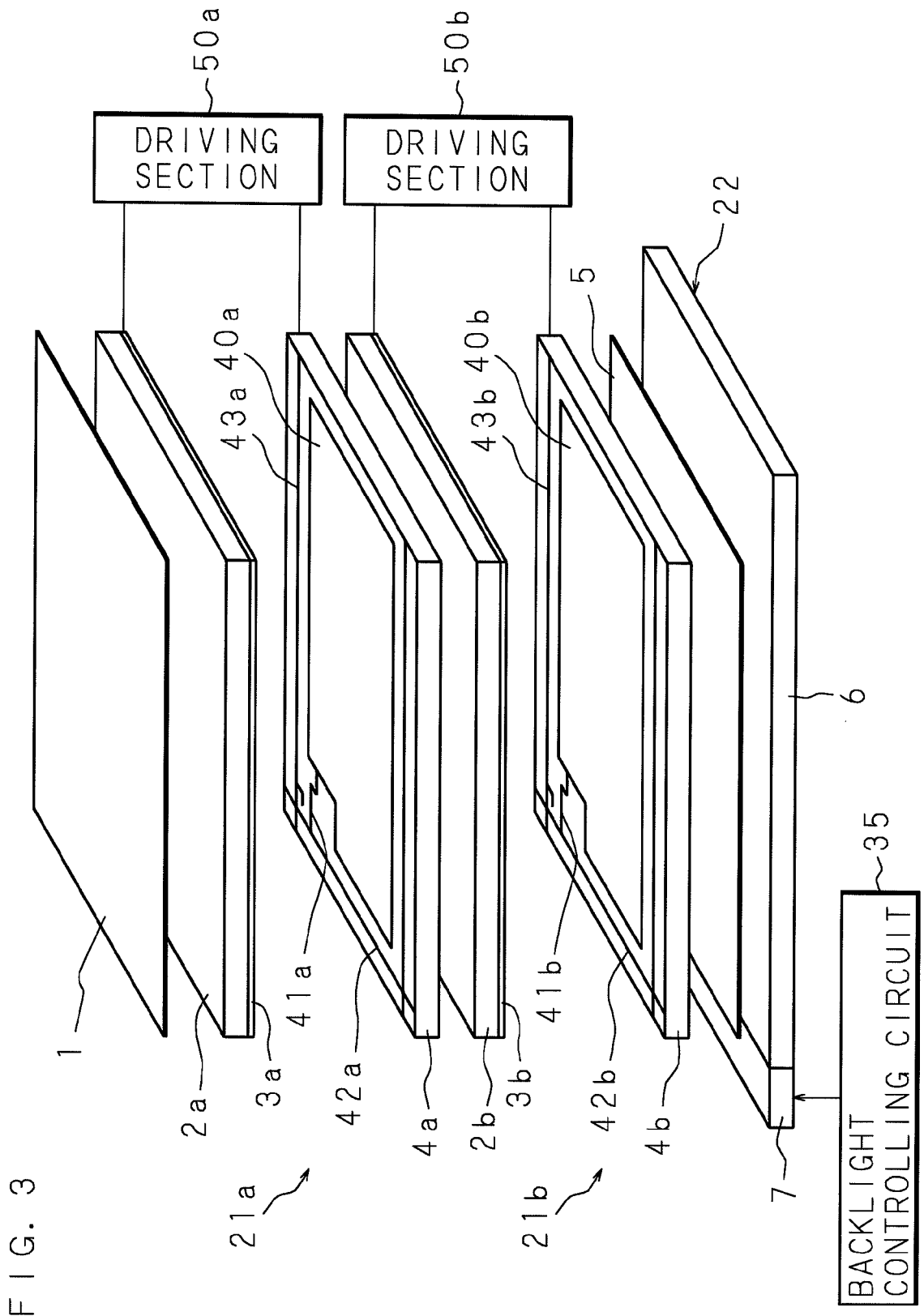
FIG. 3 is a schematic diagram illustrating an exemplary overall arrangement of the liquid crystal display device according to the first embodiment.

FIG. 1 is a block diagram illustrating a circuit configuration of a liquid crystal display device according to a first embodiment, FIG. 2 is a schematic cross-sectional view of liquid crystal panels and a backlight, and FIG. 3 is a schematic diagram illustrating an exemplary overall arrangement of the liquid crystal display device. The first embodiment provides the liquid crystal display device for performing color display in a field sequential system.

In FIG. 1, 21a, 21b denote two liquid crystal panels whose structures are shown in FIG. 2 and FIGS. 3, and 22 denotes a backlight whose structure is shown in FIG. 2 and FIG. 3.

The upper (surface side) liquid crystal panel 21a is formed by stacking a glass substrate 2a, a common electrode 3a, and a glass substrate 4a in this order from the upper layer (surface) side to the lower layer (rear face) side, and pixel electrodes 40a, 40a..., arranged in matrix, are formed at a face of the glass substrate 4a opposing to the common electrode 3a. An alignment film 12a and an alignment film 11a are disposed at upper faces of the pixel electrodes 40a, 40a... over the glass substrate 4a, and at a lower face of the common electrode 3a, respectively, and liquid crystal is filled between these alignment films 11a, 12a to form a liquid crystal layer 13a. It should be noted that 14a denotes a spacer for maintaining a layer thickness of the liquid crystal layer 13a.

Similarly to the liquid crystal panel 21a, the lower (rear face side) liquid crystal panel 21b is formed by stacking a glass substrate 2b, a common electrode 3b, and a glass substrate 4b in this order from the upper layer (surface) side to the lower layer (rear face) side, and pixel electrodes 40b, 40b, arranged in matrix, are formed at a face of the glass substrate 4b opposing to the common electrode 3b. An alignment film 12b and an alignment film 1ib are disposed at upper faces of the pixel electrodes 40b, 40b... over the glass substrate 4b, and at a lower face of the common electrode 3b, respectively, and liquid crystal is filled between these alignment films 11b, 12b to form a liquid crystal layer 13b. It should be noted that 14b denotes a spacer for maintaining a layer thickness of the liquid crystal layer 13b.

The two liquid crystal panels 21a, 21b formed and stacked in this manner are sandwiched between a pair of polarizers 1, 5 whose polarizing axes are orthogonal to each other.

Between the common electrode 3a and the pixel electrodes 40a, 40a..., a driving section 50a including a data driver 32a and a scan driver 33a, for example, is connected. The data driver 32a is connected to a TFT 41a via a signal line 42a, while the scan driver 33a is connected to the TFT 41a via a scanning line 43a. The TFT 41a is ON/OFF controlled by the scan driver 33a. Further, each of the pixel electrodes 40a, 40a... is connected to the TFT 41a. Thus, the transmitted light intensity of each pixel of the upper (surface side) liquid crystal panel 21a is controlled by a signal (applied voltage) supplied from the data driver 32a via the signal line 42a and the TFT 41a.

Similarly, between the common electrode 3b and the pixel electrodes 40b, 40b..., a driving section 50b including a data driver 32b and a scan driver 33b, for example, is connected. The data driver 32b is connected to a TFT 41b via a signal line 42b, while the scan driver 33b is connected to the TFT 41b via a scanning line 43b. The TFT 41b is ON/OFF controlled by the scan driver 33b. Further, each of the pixel electrodes 40b, 40b... is connected to the TFT 41b. Thus, the transmitted light intensity of each pixel of the lower (rear face side) liquid crystal panel 21b is controlled by a signal supplied from the data driver 32b via the signal line 42b and the TFT 41b.

The backlight 22 is located at the lower layer (rear face) side of the liquid crystal panel 21b, and is provided with an LED array 7 in a state where it faces an end face of a light directing and diffusing plate 6 constituting a light emission region. This LED array 7 has, at its face opposed to the light directing and diffusing plate 6, one or a plurality of LEDs in which LED elements for emitting three primary colors, i.e., the respective colors of red, green and blue, are provided as a single chip. And in sub-frames of red, green and blue, the red, green and blue LED elements are turned on, respectively. The light directing and diffusing plate 6 directs light, emitted from the respective LEDs of the LED array 7, to its entire surface and diffuses the light to the upper face, thereby functioning as the light emission region.

The two liquid crystal panels 21a, 21b, and the backlight 22 capable of emitting red, green and blue lights in a time-division manner are stacked. The turning-on timing and light emission color of the backlight 22 is controlled in synchronization with data scanning based on display data for the liquid crystal panels 21a, 21b.

In FIG. 1, 31 denotes a control signal generating circuit for receiving a synchronization signal SYN inputted from a personal computer, and for generating various control signals CS necessary for display. From image memories 30a, 30b, pixel data PDa to be displayed on the liquid crystal panel 21a, and pixel data PDb to be displayed on the liquid crystal panel 21b are outputted to the data drivers 32a, 32b, respectively. Based on the pixel data PDa, PDb, and the control signal CS for changing the polarity of an applied voltage, a voltage is applied to the liquid crystal layers 13a, 13b of the liquid crystal panels 21a, 21b via the data drivers 32a, 32b.

Further, the control signal CS is outputted from the control signal generating circuit 31 to each of a reference voltage generating circuit 34, the data drivers 32a, 32b, the scan drivers 33a, 33b, and a backlight controlling circuit 35. The reference voltage generating circuit 34 generates reference voltages VR1a, VR1b, VR2a and VR2b, and outputs the generated reference voltage VR1a, reference voltage VR1b, reference voltage VR2a, and reference voltage VR2b to the data driver 32a, the data driver 32b, the scan driver 33a, and the scan driver 33b, respectively.

Based on the pixel data PDa, PDb from the image memories 30a, 30b, and the control signal CS from the control signal generating circuit 31, the data drivers 32a, 32b output signals to the signal lines 42a, 42b of the pixel electrodes 40a, 40b. In synchronization with the output of the signals, the scan drivers 33a, 33b sequentially scan the scanning lines 43a, 43b of the pixel electrodes 40a, 40b for each line. Furthermore, the backlight controlling circuit 35 supplies a driving voltage to the backlight 22, thereby allowing the respective red light, green light, and blue light to be emitted from the backlight 22.

Next, the operations of the liquid crystal display device will be described. The pixel data PDa, PDb for display are inputted from a personal computer to the image memories 30a, 30b, and after temporarily having stored these pixel data PDa, PDb, the image memories 30a, 30b output these pixel data PDa, PDb upon reception of the control signal CS outputted from the control signal generating circuit 31. The control signal CS generated by the control signal generating circuit 31 is supplied to the data drivers 32a, 32b, the scan drivers 33a, 33b, the reference voltage generating circuit 34, and the backlight controlling circuit 35.

Upon reception of the control signal CS, the data drivers 32a, 32b output signals to the signal lines 42a, 42b of the pixel electrodes 40a, 40b, based on the pixel data PDa, PDb outputted from the image memories 30a, 30b. Upon reception of the control signal CS, the scan drivers 33a, 33b sequentially scan the scanning lines 43a, 43b of the pixel electrodes 40a, 40b for each line. In accordance with the output of the signals from the data drivers 32a, 32b, and the scanning of the scan drivers 33a, 33b, the TFTs 41a, 41b are driven to apply voltages to the pixel electrodes 40a, 40b, thus controlling the transmitted light intensity of each pixel.

Upon reception of the control signal CS, the backlight controlling circuit 35 supplies a driving voltage to the backlight 22 to allow the LED elements of the respective colors, i.e., red, green and blue, included in the LED array 7 of the backlight 22 to emit lights in a time-division manner, thus allowing red light, green light, and blue light to be emitted sequentially with time. In this manner, color display is carried out by synchronizing the control of turning-on of the backlight 22 (i.e., LED array 7), which emits light to be incident on the liquid crystal panels 21a, 21b, with the data scanning performed more than once on the liquid crystal panels 21a, 21b.

Figure 4:
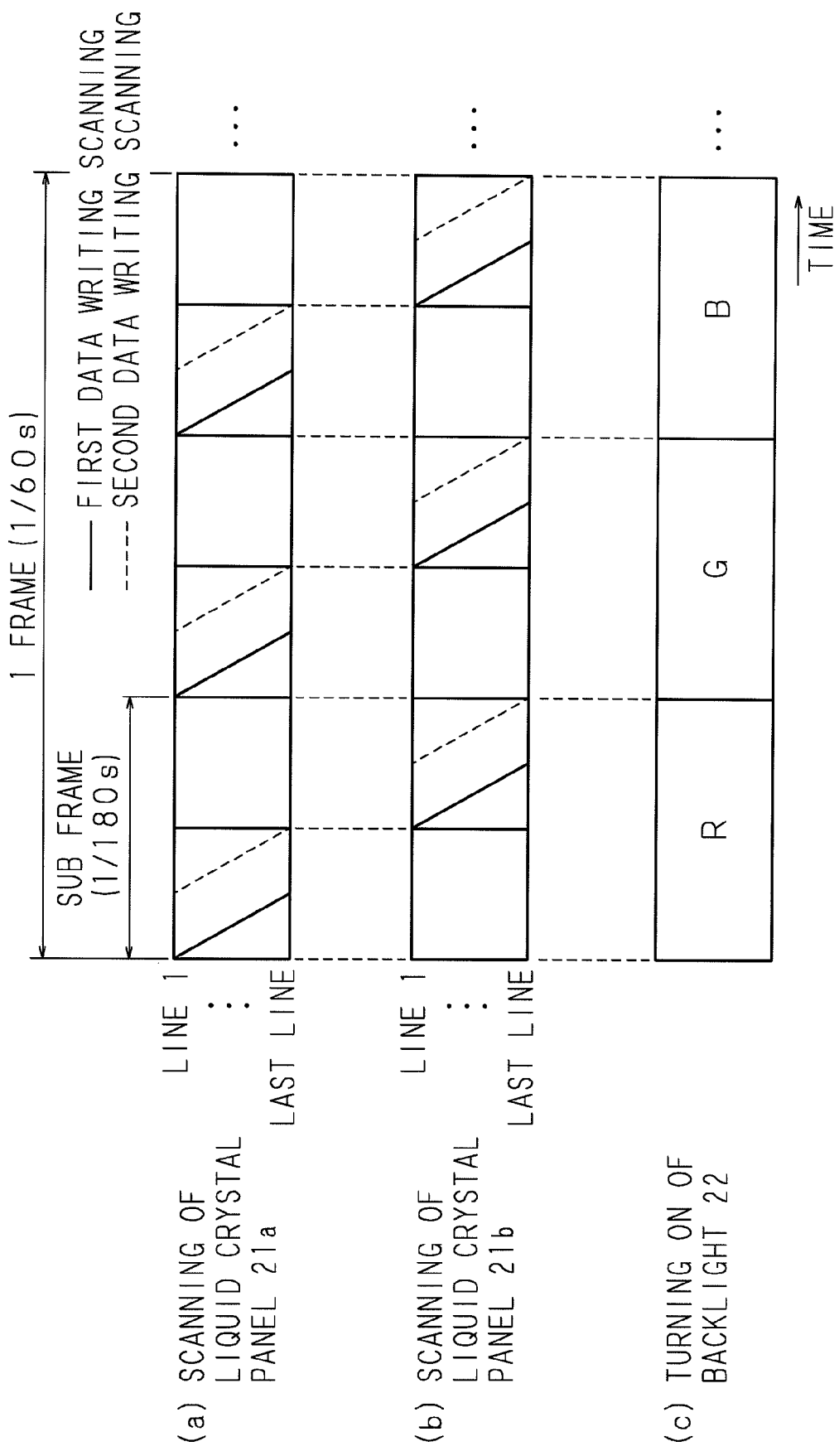
FIG. 4 shows diagrams illustrating an example of driving sequence for the liquid crystal display device according to the first embodiment.

FIG. 4 shows diagrams illustrating an example of driving sequence, in which FIG. 4(a) illustrates the scanning timing of each line of the liquid crystal panel 21a, FIG. 4(b) illustrates the scanning timing of each line of the liquid crystal panel 21b, and FIG. 4(c) illustrates the timing of turning-on of the respective colors, i.e., red, green and blue, of the backlight 22. One frame is divided into three sub-frames; for example, as shown in FIG. 4(c), red light is emitted in the first sub-frame, green light is emitted in the second sub-frame, and blue light is emitted in the third sub-frame.

Further, one sub-frame is divided into two; thus, as shown in FIG. 4(a), during the first half periods of the sub-frames of red, green and blue colors, image data writing scanning for each of red, green and blue colors is performed twice on the liquid crystal panel 21a, and as shown in FIG. 4(b), during the latter half periods, image data writing scanning for each of red, green and blue colors is performed twice on the liquid crystal panel 21b. In the first data writing scanning, the data writing scanning is performed with a polarity that can realize bright display, and in the second data writing scanning, there is applied a voltage whose polarity is opposite to that in the first data writing scanning and whose magnitude is substantially equal to that in the first data writing scanning. Thus, it is possible to realize display which is darker as compared with that of the first data writing scanning, and which can be substantially regarded as "black display".

Figure 5:
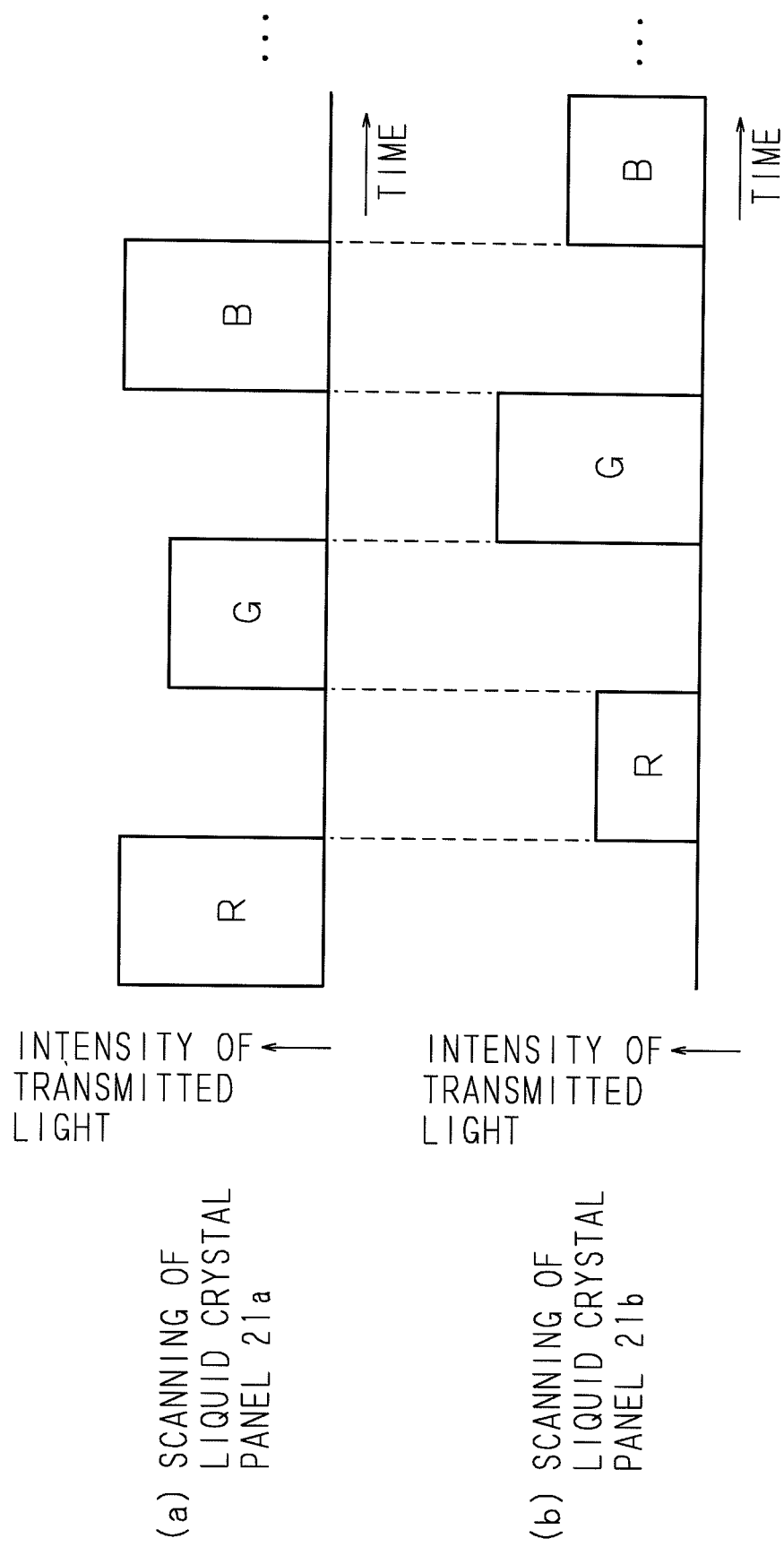
FIG. 5 shows diagrams illustrating the transmitted light intensities of the liquid crystal panels, caused by the driving sequence shown in FIG. 4.

FIGS. 5(a), (b) are diagrams illustrating the transmitted light intensities of the respective liquid crystal panels 21a, 21b, caused by the driving sequence shown in FIG. 4. While data writing scanning is performed on the liquid crystal panel 21a, i.e., while a voltage is applied to the liquid crystal layer 13a of the liquid crystal panel 21a, no data writing scanning is performed on the liquid crystal panel 21b, i.e., no voltage is applied to the liquid crystal layer 13b of the liquid crystal panel 21b. To the contrary, while data writing scanning is performed on the liquid crystal panel 21b, i.e., while a voltage is applied to the liquid crystal layer 13b of the liquid crystal panel 21b, no data writing scanning is performed on the liquid crystal panel 21a, i.e., no voltage is applied to the liquid crystal layer 13a of the liquid crystal panel 21a.

By carrying out the time-division control of the timing of voltage application to the liquid crystal layers 13a, 13b of both the liquid crystal panels 21a, 21b in this manner, no image is displayed on the liquid crystal panel 21b while an image is displayed on the liquid crystal panel 21a; on the other hand, no image is displayed on the liquid crystal panel 21a while an image is displayed on the liquid crystal panel 21b. In this case, in the liquid crystal panel on which no image is displayed, the longitudinal axial direction of liquid crystal molecules inside its liquid crystal layer coincides with the polarizing axial direction of the polarizers 1, 5, or is orthogonal to the polarizing axial direction. If the direction of liquid crystal molecules is aligned, the influence of double refraction is not exerted, which is equivalent to the situation where the stacked liquid crystal panel on which no image is displayed does not exist. Accordingly, the overall voltage-transmitted light intensity characteristic corresponds to the sum of the voltage-transmitted light intensity characteristics of the respective liquid crystal panels 21a, 21b.

Figure 6:
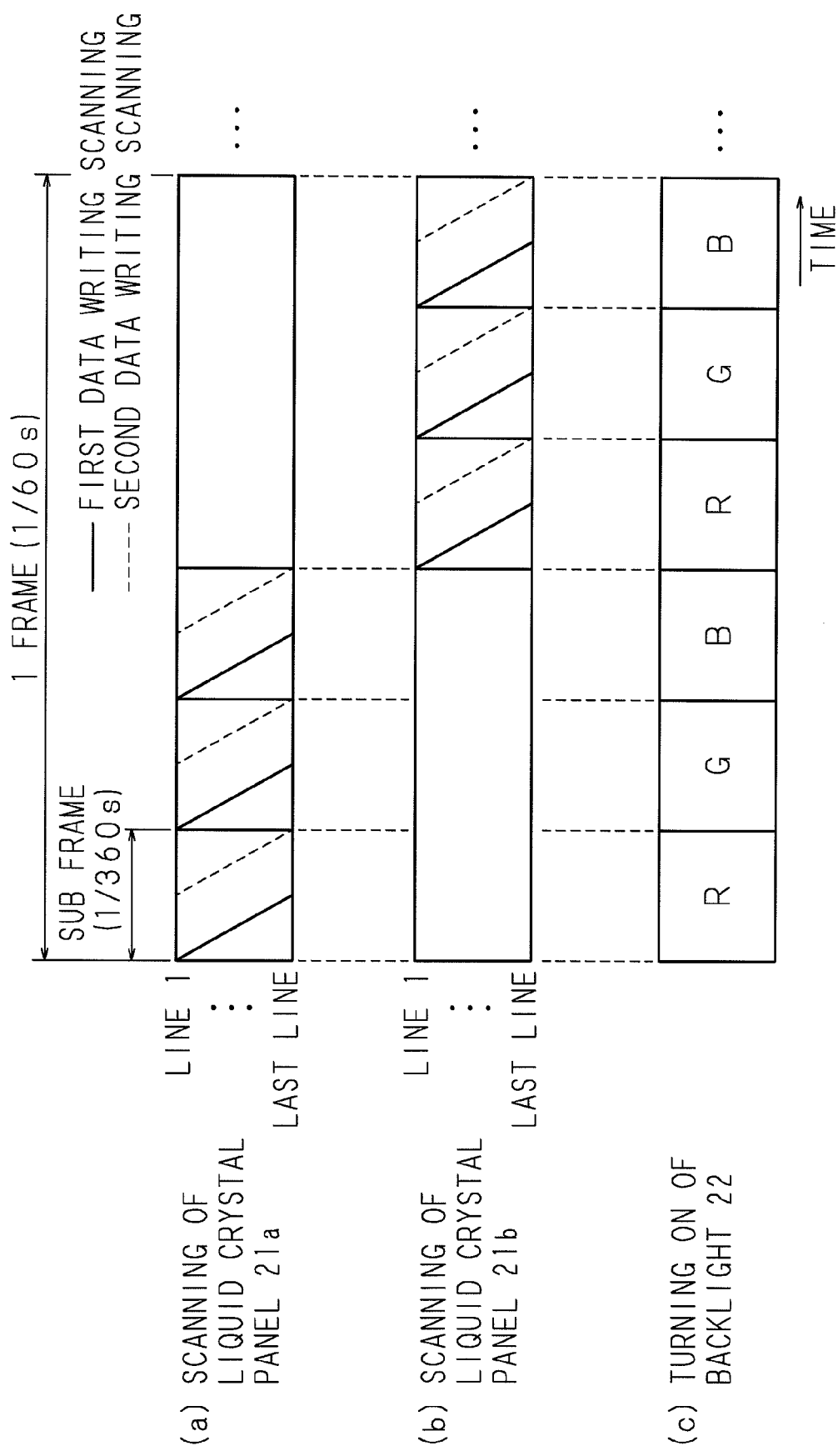
FIG. 6 shows diagrams illustrating another example of driving sequence for the liquid crystal display device according to the first embodiment.

FIG. 6 shows diagrams illustrating another example of driving sequence, in which FIG. 6(a) illustrates the scanning timing of each line of the liquid crystal panel 21a, FIG. 6(b) illustrates the scanning timing of each line of the liquid crystal panel 21b, and FIG. 6(c) illustrates the timing of turning-on of the respective colors, i.e., red, green and blue, of the backlight 22. One frame is divided into two, i.e., a first half period and a latter half period, and each period is divided into three sub-frames; for example, as shown in FIG. 6(c), red light is emitted in the first sub-frame of each period, green light is emitted in the second sub-frame of each period, and blue light is emitted in the third sub-frame of each period.

Further, as shown in FIG. 6(a), during the first half period of one frame, image data writing scanning for each of red, green and blue colors is performed twice on the liquid crystal panel 21a in this order, and as shown in FIG. 6(b), during the latter half period of one frame, image data writing scanning for each of red, green and blue colors is performed twice on the liquid crystal panel 21b in this order. In the first data writing scanning, the data writing scanning is performed with a polarity that can realize bright display, and in the second data writing scanning, there is applied a voltage whose polarity is opposite to that in the first data writing scanning and whose magnitude is substantially equal to that in the first data writing scanning. Thus, it is possible to realize display which is darker as compared with that of the first data writing scanning, and which can be substantially regarded as "black display".

Figure 7:
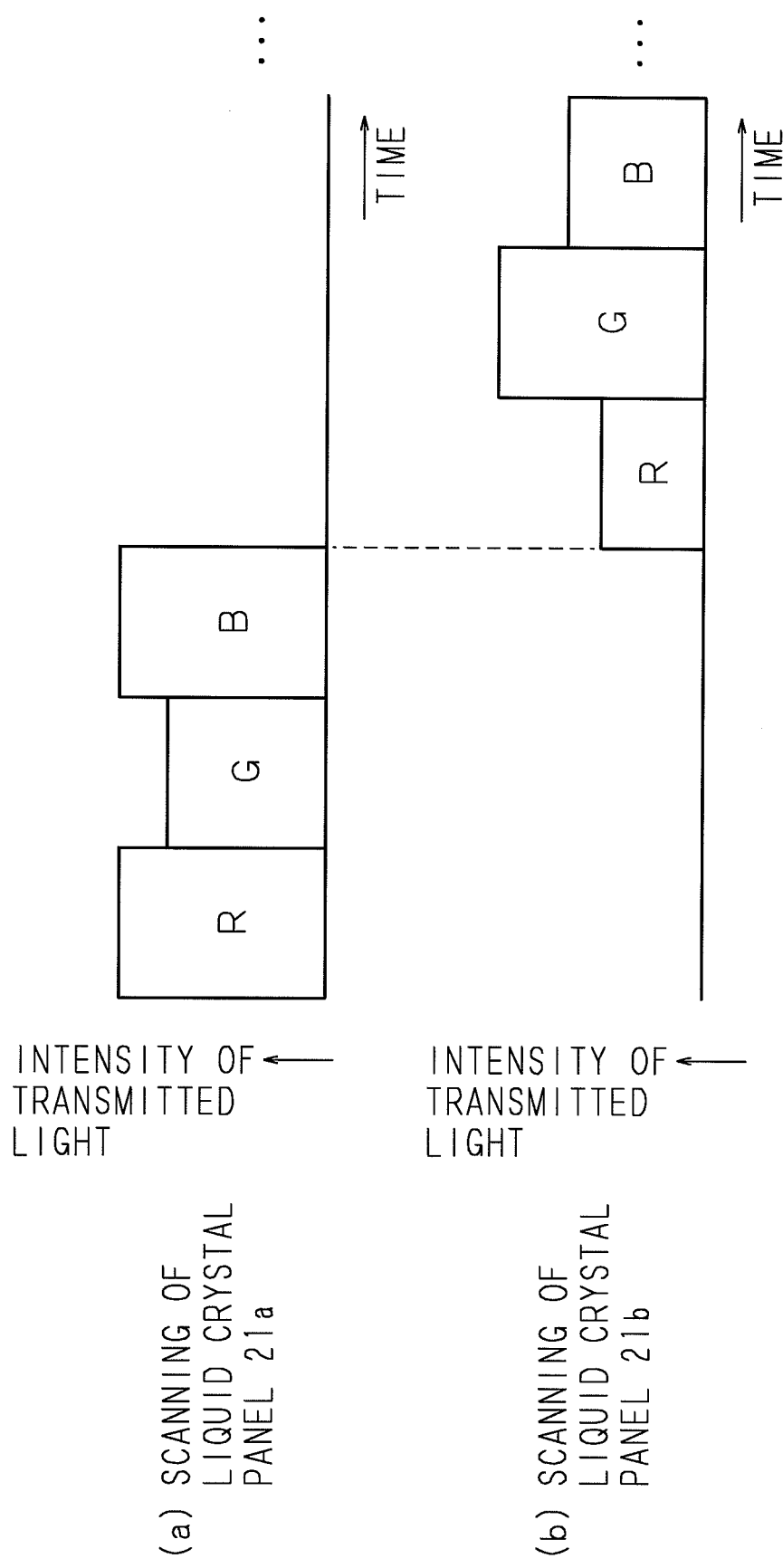
FIG. 7 shows diagrams illustrating the transmitted light intensities of the liquid crystal panels, caused by the driving sequence shown in FIG. 6.

FIGS. 7(a), (b) are diagrams illustrating the transmitted light intensities of the respective liquid crystal panels 21a, 21b, caused by the driving sequence shown in FIG. 6. Also in this example, similarly to the above-described example, no voltage is simultaneously applied to the liquid crystal layer 13a of the liquid crystal panel 21a and to the liquid crystal layer 13b of the liquid crystal panel 21b, and no image is simultaneously displayed on the liquid crystal panel 21a and on the liquid crystal panel 21b, thus allowing the overall voltage-transmitted light intensity characteristic to correspond to the sum of the voltage-transmitted light intensity characteristics of the respective liquid crystal panels 21a, 21b.

A specific example of the liquid crystal display device according to the first embodiment will be described. A TFT substrate having pixel electrodes 40a, 40a ... (40b, 40b ... ) (800×600 pixels, 4 inches diagonally), and a glass substrate 2a (2b) having a common electrode 3a (3b) were cleaned, and thereafter, polyimide was applied thereto and baked at 200° C. for an hour, thus forming polyimide films of about 200 Å as alignment films 11a, 12a (11b, 12b). Moreover, these alignment films 11a, 12a (11b, 12b) were subjected to rubbing using a rayon cloth, and these two substrates were stacked with a gap maintained therebetween by a silica spacer 14a (14b) having an average particle diameter of 1.6 μm, thus forming an empty panel therebetween.

Between the alignment films 11a, 12a (11b, 12b) of this empty panel, monostable ferroelectric liquid crystal exhibiting a half-V-shaped electro-optic response characteristic was filled to provide a liquid crystal layer 13a (13b). After the filling, a dc voltage of 3V was applied in a vicinity of the transition point from the cholesteric phase to the chiral smectic C phase, thus realizing uniform liquid crystal alignment state.

The formed liquid crystal panel 21a (21b) was connected with a driver IC and a controlling circuit that enables display in a field sequential system, as shown in FIG. 1. The two liquid crystal panels 21a, 21b provided with such driver IC and controlling circuit were stacked, the stacked panels were sandwiched between a pair of polarizers 1, 5 in the cross nicol state, and a backlight 22, in which an LED array 7 capable of performing of red, green and blue is used as a light source, was further stacked.

With the use of both the liquid crystal panels 21a, 21b, three-dimensional image display was performed in accordance with the respective driving sequences shown in FIG. 4 and FIG. 6. In the case of overlapping of displays on the liquid crystal panels 21a, 21b, in order to create three-dimensionality, the image of a distant object was displayed on the lower (rear face side) liquid crystal panel 21b, the image of a nearby object was displayed on the upper (surface side) liquid crystal panel 21a, and the image of an intermediate object was displayed so as to create a sense of depth by adjusting the brightness of both the liquid crystal panels 21a, 21b.

As a result, in any of the driving sequences, bright and high-resolution image display exhibiting high display color purity and filled with three-dimensionality was enabled.

<Embodiment 2>

Figure 8:
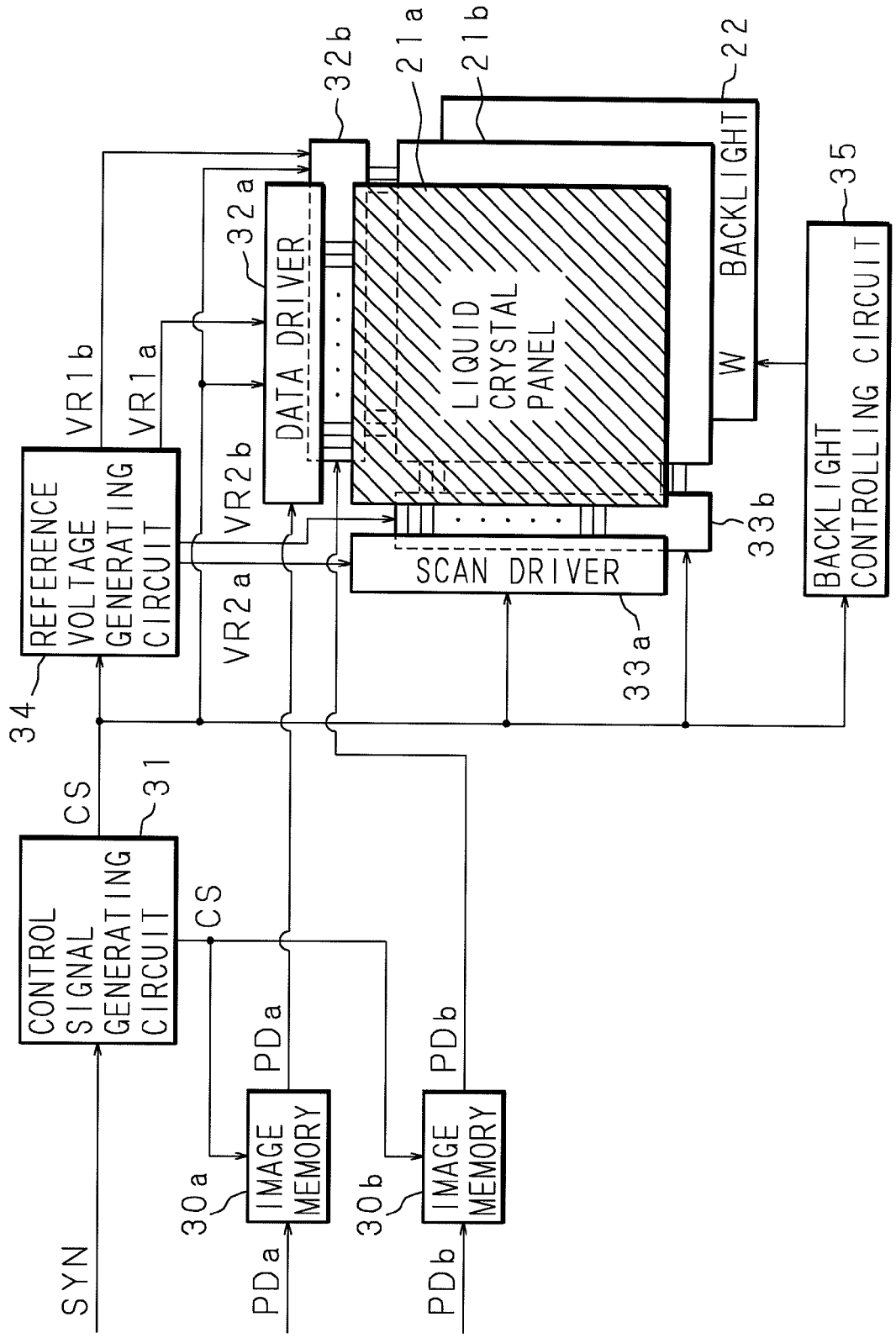
FIG. 8 is a block diagram illustrating a circuit configuration of a liquid crystal display device according to a second embodiment (color filter system)
Figure 9:
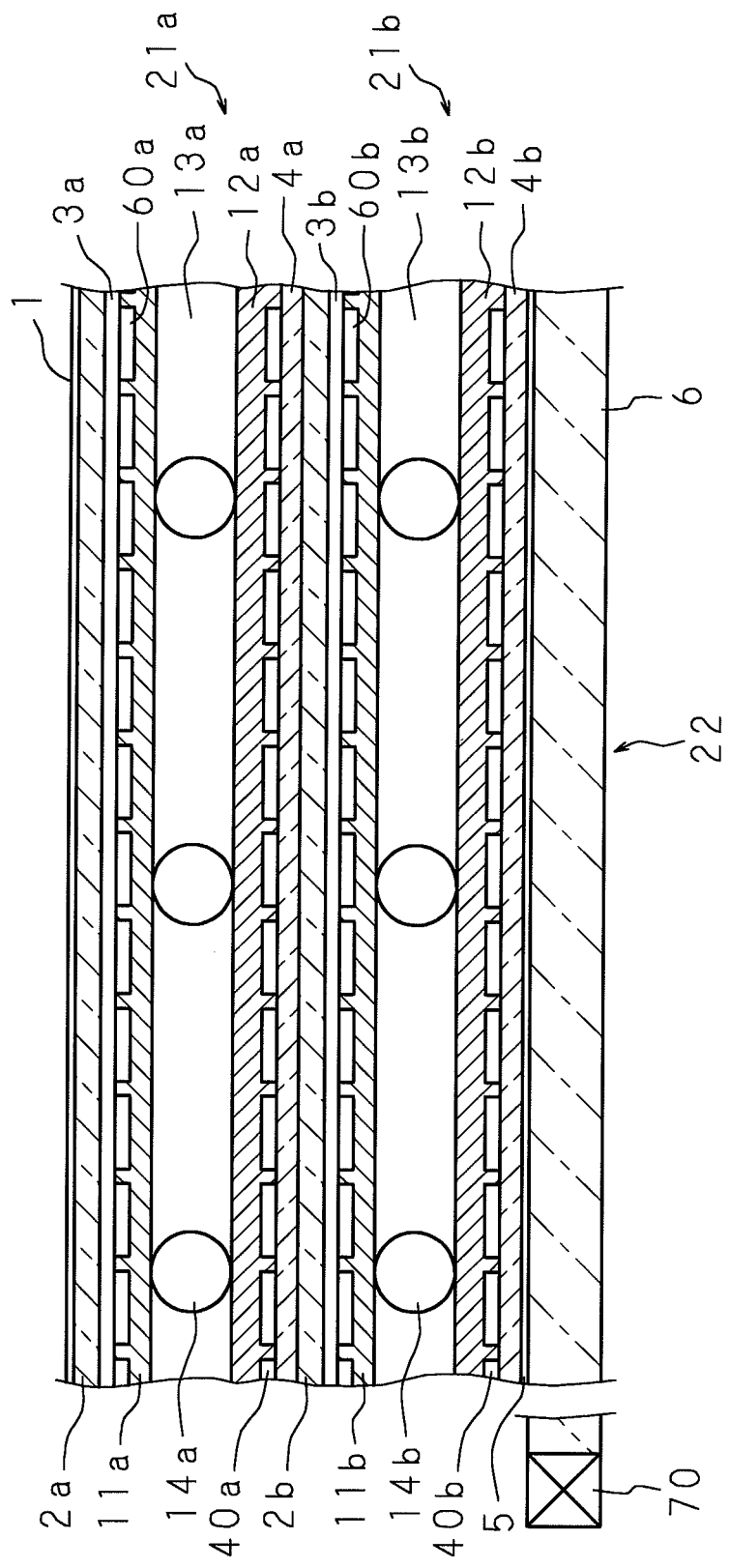
FIG. 9 is a schematic cross-sectional view of liquid crystal panels and a backlight of the liquid crystal display device according to the second embodiment.
Figure 10:
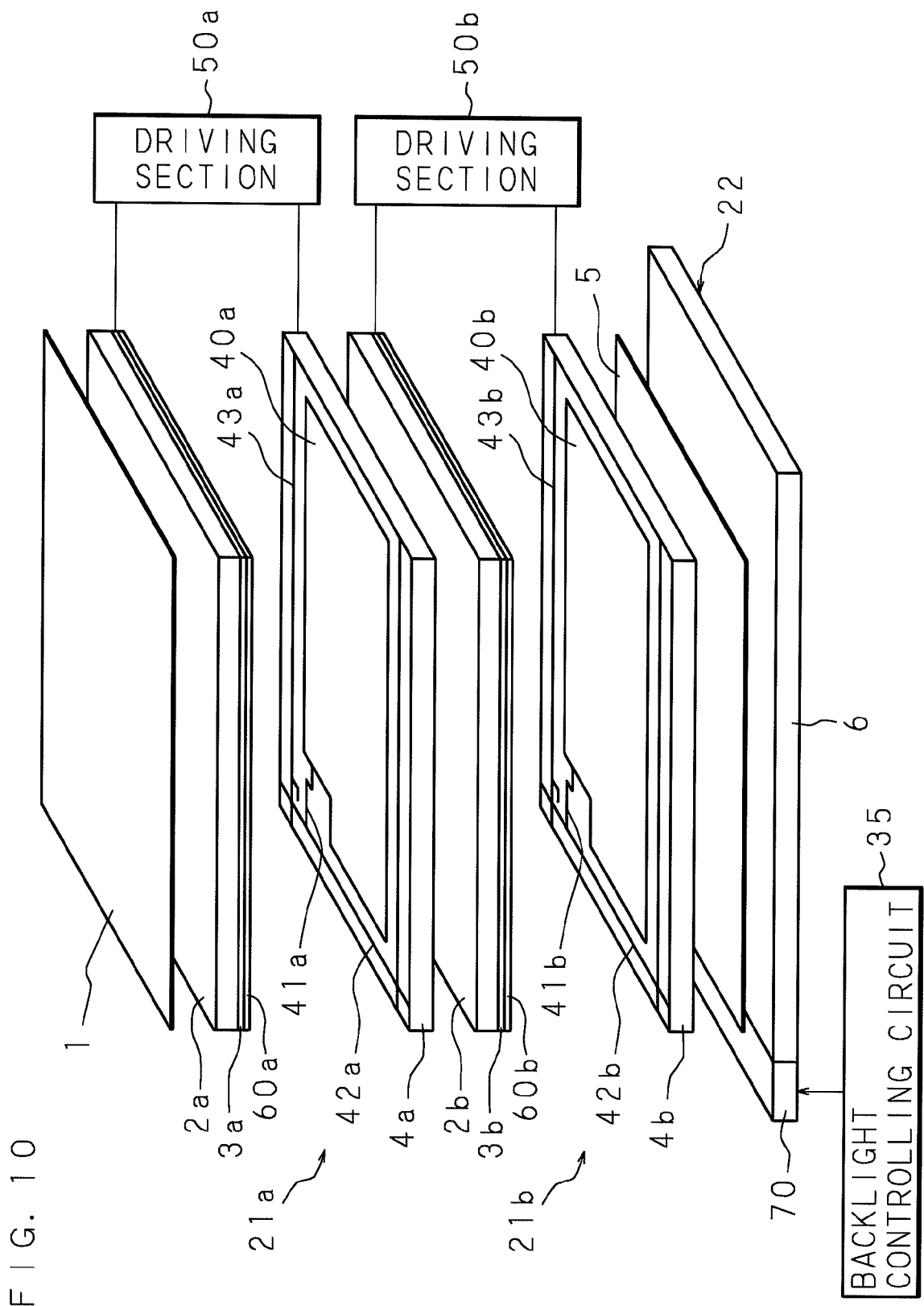
FIG. 10 is a schematic diagram illustrating an exemplary overall arrangement of the liquid crystal display device according to the second embodiment.

FIG. 8 is a block diagram illustrating a circuit configuration of a liquid crystal display device according to a second embodiment, FIG. 9 is a schematic cross-sectional view of liquid crystal panels and a backlight, and FIG. 10 is a schematic diagram illustrating an exemplary overall arrangement of the liquid crystal display device. The second embodiment provides the liquid crystal display device for performing color display in a color filter system. In FIG. 8 to FIG. 10, parts identical to or similar to those in FIG. 1 to FIG. 3 are denoted by the same numerals.

Common electrodes 3a, 3b are provided with color filters 60a, 60a . . . , 60b, 60b . . . of three primary colors (R, G, and B). Further, a backlight 22 includes: a white light source 70 provided with one or a plurality of white light source elements for emitting white light; and a light directing and diffusing plate 6. In such a color filter liquid crystal display device, white light, emitted from the white light source 70 capable of emitting white light in a time-division manner, is selectively transmitted through the multi-color color filters 60a, 60b, thus performing color display.

Figure 11:
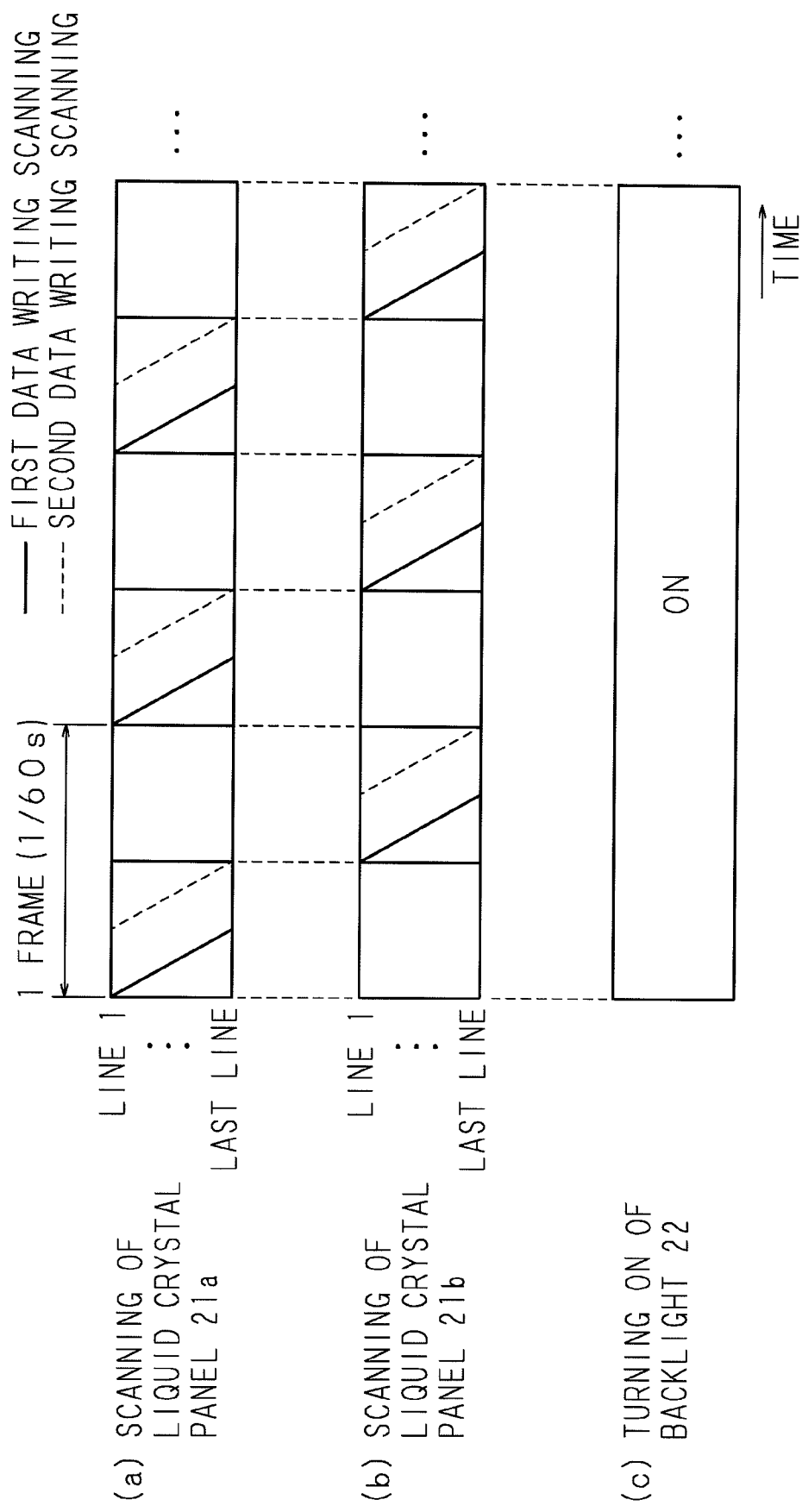
FIG. 11 shows diagrams illustrating an example of driving sequence for the liquid crystal display device according to the second embodiment.

FIG. 11 shows diagrams illustrating an example of driving sequence, in which FIG. 11(a) illustrates the scanning timing of each line of a liquid crystal panel 21a, FIG. 11(b) illustrates the scanning timing of each line of a liquid crystal panel 21b, and FIG. 11(c) illustrates the timing of turning-on of the backlight 22.

One frame is divided into two, i.e., a first half period and a latter half period; thus, as shown in FIG. 11(a), during the first half period, image data writing scanning is performed twice on the liquid crystal panel 21a, and as shown in FIG. 11(b), during the latter half period, image data writing scanning is performed twice on the liquid crystal panel 21b. In the first data writing scanning, the data writing scanning is performed with a polarity that can realize bright display, and in the second data writing scanning, there is applied a voltage whose polarity is opposite to that in the first data writing scanning and whose magnitude is substantially equal to that in the first data writing scanning. Thus, it is possible to realize display which is darker as compared with that of the first data writing scanning, and which can be substantially regarded as "black display".

Figure 12:
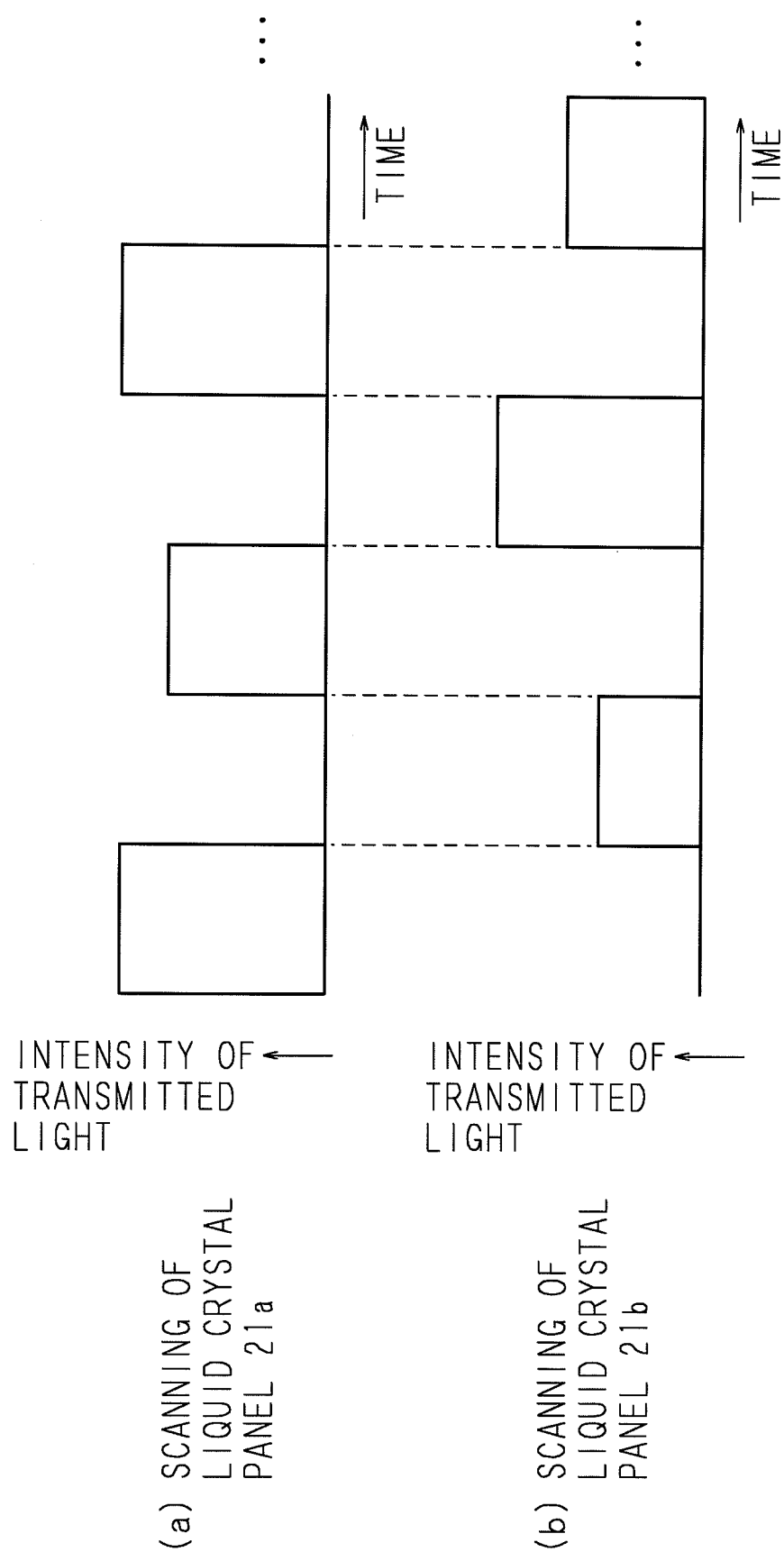
FIG. 12 shows diagrams illustrating the transmitted light intensities of the liquid crystal panels, caused by the driving sequence shown in FIG. 11.

FIGS. 12(a), (b) are diagrams illustrating the transmitted light intensities of the respective liquid crystal panels 21a, 21b, caused by the driving sequence shown in FIG. 11. Also in this color filter liquid crystal display device, similarly to the above-described field sequential liquid crystal display device, no voltage is simultaneously applied to a liquid crystal layer 13a of the liquid crystal panel 21a and to a liquid crystal layer 13b of the liquid crystal panel 21b, and no image is simultaneously displayed on the liquid crystal panel 21a and on the liquid crystal panel 21b. Consequently, because of the same reason as in the field sequential liquid crystal display device, the overall voltage-transmitted light intensity characteristic corresponds to the sum of the voltage-transmitted light intensity characteristics of the respective liquid crystal panels 21a, 21b.

A specific example of the liquid crystal display device according to the second embodiment will be described. A TFT substrate having pixel electrodes 40a, 40a (40b, 40b . . . ) (320×3(RGB)×240 pixels, 4 inches diagonally), and a glass substrate 2a (2b) having a common electrode 3a (3b) and RGB color filters 60a, 60a . . . (60b, 60b . . . ) were cleaned, and thereafter, polyimide was applied thereto and baked at 200° C. for an hour, thus forming polyimide films of about 200 Å as alignment films 11a, 12a (11b, 12b). Moreover, these alignment films 11a, 12a (11b, 12b) were subjected to rubbing using a rayon cloth, and these two substrates were stacked with a gap maintained therebetween by a silica spacer 14a (14b) having an average particle diameter of 1.6 µm, thus forming an empty panel therebetween.

Between the alignment films 11a, 12a (11b, 12b) of this empty panel, bistable ferroelectric liquid crystal, consisting mainly of naphthalene-based liquid crystal exhibiting a half-V-shaped electro-optic response characteristic, was filled to provide a liquid crystal layer 13a (13b). The formed liquid crystal panel 21a (21b) was connected with a driver IC and a controlling circuit that enables display in a color filter system, as shown in FIG. 8. The two liquid crystal panels 21a, 21b provided with such driver IC and controlling circuit were stacked, the stacked panels were sandwiched between a pair of polarizers 1, 5 in the cross nicol state, and a backlight 22 having a white light source 70 was further stacked.

With the use of both the liquid crystal panels 21a, 21b, three-dimensional image display was performed in accordance with the driving sequence shown in FIG. 11. In the case of overlapping of displays on the liquid crystal panels 21a, 21b, in order to create three-dimensionality, the image of a distant object was displayed on the lower (rear face side) liquid crystal panel 21b, the image of a nearby object was displayed on the upper (surface side) liquid crystal panel 21a, and the image of an intermediate object was displayed so as to create a sense of depth by adjusting the brightness of both the liquid crystal panels 21a, 21b.

As a result, bright and high-resolution image display exhibiting high display color purity and filled with three-dimensionality was enabled.

Figure 13:
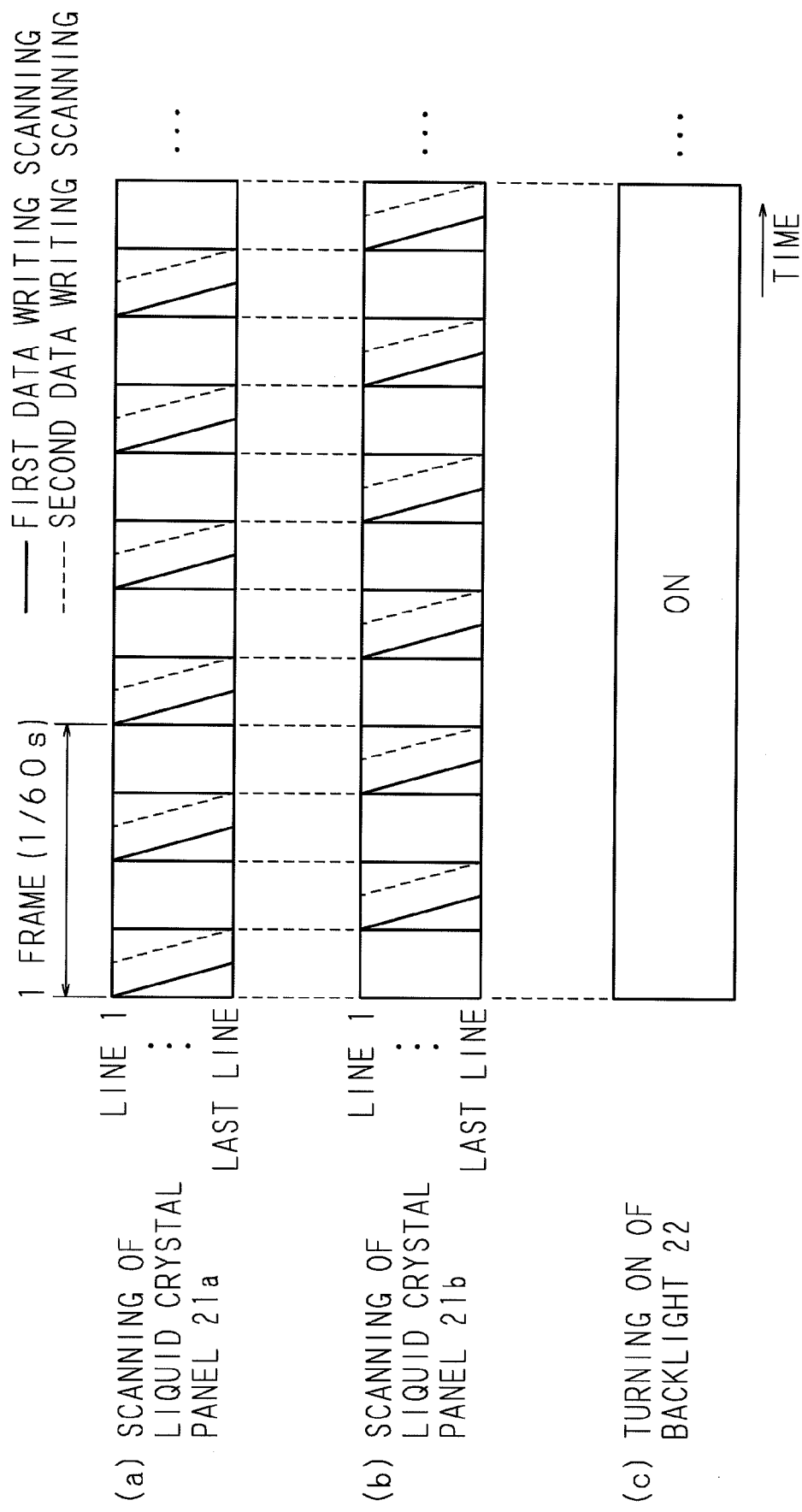
FIG. 13 shows diagrams illustrating another example of driving sequence for the liquid crystal display device according to the second embodiment.

FIG. 13 shows diagrams illustrating another example of driving sequence for the liquid crystal display device according to the second embodiment, in which FIG. 13(a) illustrates the scanning timing of each line of the liquid crystal panel 21a, FIG. 13(b) illustrates the scanning timing of each line of the liquid crystal panel 21b, and FIG. 13(c) illustrates the timing of turning-on of the backlight 22. The data writing scanning performed twice on the liquid crystal panel 21a, and the data writing scanning performed twice on the liquid crystal panel 21b are each repeated for two patterns within one frame.

FIGS. 14(a), (b) are diagrams illustrating the transmitted light intensities of the respective liquid crystal panels 21a, 21b, caused by the driving sequence shown in FIG. 13. Also in this example, the effects similar to those of the above-described examples can be achieved. This example is suitable for displaying moving images because the number of switching of display images is larger than that of switching of display images in the example illustrated in FIG. 11 and FIG. 12. It should be noted that the case where data writing scanning of each panel is repeated for two patterns within one frame has been described; however, the data writing scanning may naturally be repeated for three or more patterns.

Furthermore, such a technique for repeating voltage application (image display) for a plurality of patterns within one frame is also applicable to the driving sequences (FIG. 4, FIG. 6) for the above-described field sequential liquid crystal display device.

It should be noted that, in each of the foregoing embodiments, a voltage is applied to the liquid crystal layer 13a of the liquid crystal panel 21a and to the liquid crystal layer 13b of the liquid crystal panel 21b in a time-division manner, so that an image is displayed on the liquid crystal panel 21a and on the liquid crystal panel 21b in a time-division manner (i.e., so that the display time of the liquid crystal panel 21a is equal to that of the liquid crystal panel 21b); however, if an image is to be prevented from being displayed simultaneously on the liquid crystal panel 21a and on the liquid crystal panel 21b, the display time of the liquid crystal panel 21a may be different from that of the liquid crystal panel 21b.

Further, it is sufficient to satisfy the conditions for preventing an image from being displayed simultaneously on the liquid crystal panel 21a and on the liquid crystal panel 21b, and a period during which no image is displayed on the liquid crystal panel 21a and on the liquid crystal panel 21b may exist within one frame.

In each of the foregoing embodiments, the case where the two liquid crystal panels 21a, 21b are stacked has been described; however, the description is also naturally applicable to a liquid crystal display device formed so that three or more liquid crystal panels are stacked.

Furthermore, the case where ferroelectric liquid crystal exhibiting spontaneous polarization is used has been described as an example; however, it is needless to say that even if the other liquid crystal exhibiting spontaneous polarization, e.g., anti-ferroelectric liquid crystal, is used, or even if nematic liquid crystal exhibiting no spontaneous polarization is used, the effects similar to those obtained in the case of using ferroelectric liquid crystal are obtainable when the alignment state of liquid crystal molecules is approximately in parallel with a substrate due to an IPS system.

Moreover, although the transmissive liquid crystal display device has been described, the description is also similarly applicable to a reflective or semi-transmissive liquid crystal display device. In the case of a reflective or semi-transmissive liquid crystal display device, display is enabled without using any light source such as a backlight, thus achieving low power consumption.

In the liquid crystal display device and display method of embodiments, the voltage application to the liquid crystal of each of the plurality of liquid crystal panels is controlled, and during voltage application to the liquid crystal of one of the liquid crystal panels based on display data, no voltage is applied to the other liquid crystal panel. In other words, no image is displayed simultaneously on the two or more liquid crystal panels, and an image is displayed on each of the plurality of liquid crystal panels in a time-division manner. Thus, in the liquid crystal panel to which no voltage is applied and on which no image is displayed, the longitudinal axial direction of liquid crystal molecules coincides with the polarizing axial direction of the polarizers, or is orthogonal to the polarizing axial direction; therefore, no influence is exerted on the overall double refraction, and the overall voltage-transmitted light intensity characteristic corresponds to the sum of the voltage-transmitted light intensity characteristics of the respective liquid crystal panels.

In the liquid crystal display device of an embodiment, a material having spontaneous polarization is used as liquid crystal. Hence, fast response is enabled so that a high moving image display characteristic is obtained, and furthermore, it is possible to perform display in a field sequential system.

In the liquid crystal display device of an embodiment, ferroelectric liquid crystal having a small spontaneous polarization value is used as liquid crystal having spontaneous polarization. Hence, the driving by a switching element such as a TFT is facilitated.

In the liquid crystal display device of an embodiment, color display is performed in a field sequential system in which lights of a plurality of colors are switched with time. Hence, color display with high resolution, high color purity, and fast response is enabled.

In the liquid crystal display device of an embodiment, color display is performed in a color filter system in which color filters are used. Hence, color display is performed with ease.

As this description may be embodied in several forms without departing from the spirit of essential characteristics thereof, the present embodiment is therefore illustrative and not restrictive, since the scope where the specification as a whole seeks protection is defined by the appended claims rather than by description preceding them, and all changes that fall within metes and bounds of the claims, or equivalence of such metes and bounds thereof are therefore intended to be embraced by the claims.

What is claimed is:

1. A liquid crystal display device comprising:
a controller for displaying a three-dimensional image in a plurality of frames by stacking a plurality of liquid crystal panels in each of which a gap formed by a plurality of substrates is filled with liquid crystal, the controller applying a voltage to the liquid crystal of each of the plurality of liquid crystal panels based on image display data, in order to control a liquid crystal light transmittance,
wherein each frame is configured with a plurality of sub-frames, and
a non-display voltage is applied to the liquid crystal included in one of the liquid crystal panels in a sub-frame in which a display voltage is applied to the liquid crystal included in the other of the liquid crystal panels based on image display data,
wherein an object to be expressed far in the displayed three-dimensional image of each frame is displayed on a liquid crystal panel among the plurality of liquid crystal panels, and an object to be expressed close in the displayed three-dimensional image of each frame is displayed on another liquid crystal panel among the plurality of liquid crystal panels.

2. A liquid crystal display device according to claim 1, wherein:
the controller controls, in a time-division manner, the applying of the voltage to the liquid crystal of each of the plurality of liquid crystal panels based on image display data, and
time periods of the applying of the voltage to the liquid crystal of respective liquid crystal panels are equal.

3. A liquid crystal display device according to claim 1, wherein the liquid crystal has spontaneous polarization.

4. A liquid crystal display device according to claim 3, wherein the liquid crystal is ferroelectric liquid crystal.

5. A liquid crystal display device according to claim 1, wherein color display is performed in a field sequential system.

6. A liquid crystal display device according to claim 1, wherein color display is performed in a color filter system.

7. A display method, comprising:
 displaying a three-dimensional image in a plurality of frames by stacking a plurality of liquid crystal panels, in each of which a gap formed by a plurality of substrates is filled with liquid crystal, so as to sandwich the panels between polarizers; and
 controlling a liquid crystal light transmittance by applying a voltage to the liquid crystal of the stacked liquid crystal panels,
 wherein each frame is configured with a plurality of sub-frames,
 wherein a voltage is applied to the liquid crystal included in one of the liquid crystal panel in a sub-frame in which a non-display display voltage is applied to the liquid crystal included in the other of the liquid crystal panels based on image display data, and
 wherein a three-dimensional image is displayed so that the longitudinal axial direction of liquid crystal molecules of the other of the liquid crystal panels is orthogonal to the polarizing axial direction or polarizing axes of the polarizers while applying the display voltage to the liquid crystal included in said one of the liquid crystal panels based on image display data,
 wherein an object to be expressed far in the displayed three-dimensional image of each frame is displayed on a liquid crystal panel among the plurality of liquid crystal panels, and an object to be expressed close in the displayed three-dimensional image of each frame is displayed on another liquid crystal panel among the plurality of liquid crystal panels.

8. A display method according to claim 7, wherein a voltage to the liquid crystal of the other liquid crystal panel serves as a non-display voltage while applying a display voltage to the liquid crystal of one of the liquid crystal panels based on image display data.

* * * * *